United States Patent
Billon et al.

(10) Patent No.: US 8,820,919 B2
(45) Date of Patent: Sep. 2, 2014

(54) METHOD OF ADJUSTING A DISPLAY OF BINOCULAR TYPE COMPRISING A PAIR OF SPECTACLES AND DISPLAY FOR THE IMPLEMENTATION OF THIS METHOD

(75) Inventors: Bertrand Billon, Charenton-le-Pont (FR); Cédric Buchon, Charenton-le-Pont (FR); Vincent Roptin, Charenton-le-Pont (FR)

(73) Assignee: Essilor International (Compagnie Generale d'Optique, Charenton-le-Pont (FR)

( * ) Notice: Subject to any disclaimer, the term of this patent is extended or adjusted under 35 U.S.C. 154(b) by 247 days.

(21) Appl. No.: 13/379,448

(22) PCT Filed: Jun. 9, 2010

(86) PCT No.: PCT/FR2010/051143
§ 371 (c)(1),
(2), (4) Date: Mar. 14, 2012

(87) PCT Pub. No.: WO2011/004089
PCT Pub. Date: Jan. 13, 2011

(65) Prior Publication Data
US 2012/0169573 A1    Jul. 5, 2012

(30) Foreign Application Priority Data
Jul. 10, 2009  (FR) .................... 09 54841

(51) Int. Cl.
*G02C 5/00* (2006.01)
*G02C 1/00* (2006.01)

(52) U.S. Cl.
USPC ............................. 351/41; 351/158

(58) Field of Classification Search
USPC .......... 351/41, 158; 359/629, 630; 349/11, 15
See application file for complete search history.

(56) References Cited

U.S. PATENT DOCUMENTS

| | | | |
|---|---|---|---|
| 5,347,400 A * | 9/1994 | Hunter | 359/815 |
| 5,671,087 A | 9/1997 | Kawamura | |
| 6,538,624 B1 | 3/2003 | Karasawa et al. | |
| 2003/0184868 A1 | 10/2003 | Geist | |
| 2009/0153437 A1* | 6/2009 | Aharoni | 345/8 |
| 2010/0289880 A1 | 11/2010 | Moliton | |

OTHER PUBLICATIONS

International Search Report dated Sep. 30, 2010.

* cited by examiner

*Primary Examiner* — Scott J Sugarman
*Assistant Examiner* — Mustak Choudhury
(74) *Attorney, Agent, or Firm* — Sofer & Haroun, LLP

(57) ABSTRACT

The invention provides an adjustment method for adjusting a binocular display, the display comprising for each eye of the wearer, an optical imager for shaping light beams corresponding to an image emitted by a beam generator device and for directing them towards each of the wearer's eyes so as to enable information content contained in a virtual image to be viewed, the display being associated with a pair of eyeglasses having two lenses supported by a frame. According to the invention, the method consists in moving at least one said lens (10A, 10B) relative to said frame (11) with three degrees of freedom, in order to obtain superposition of the two virtual images, each said imager being contained in said lens (10A, 10B) of said pair of eyeglasses.

8 Claims, 4 Drawing Sheets

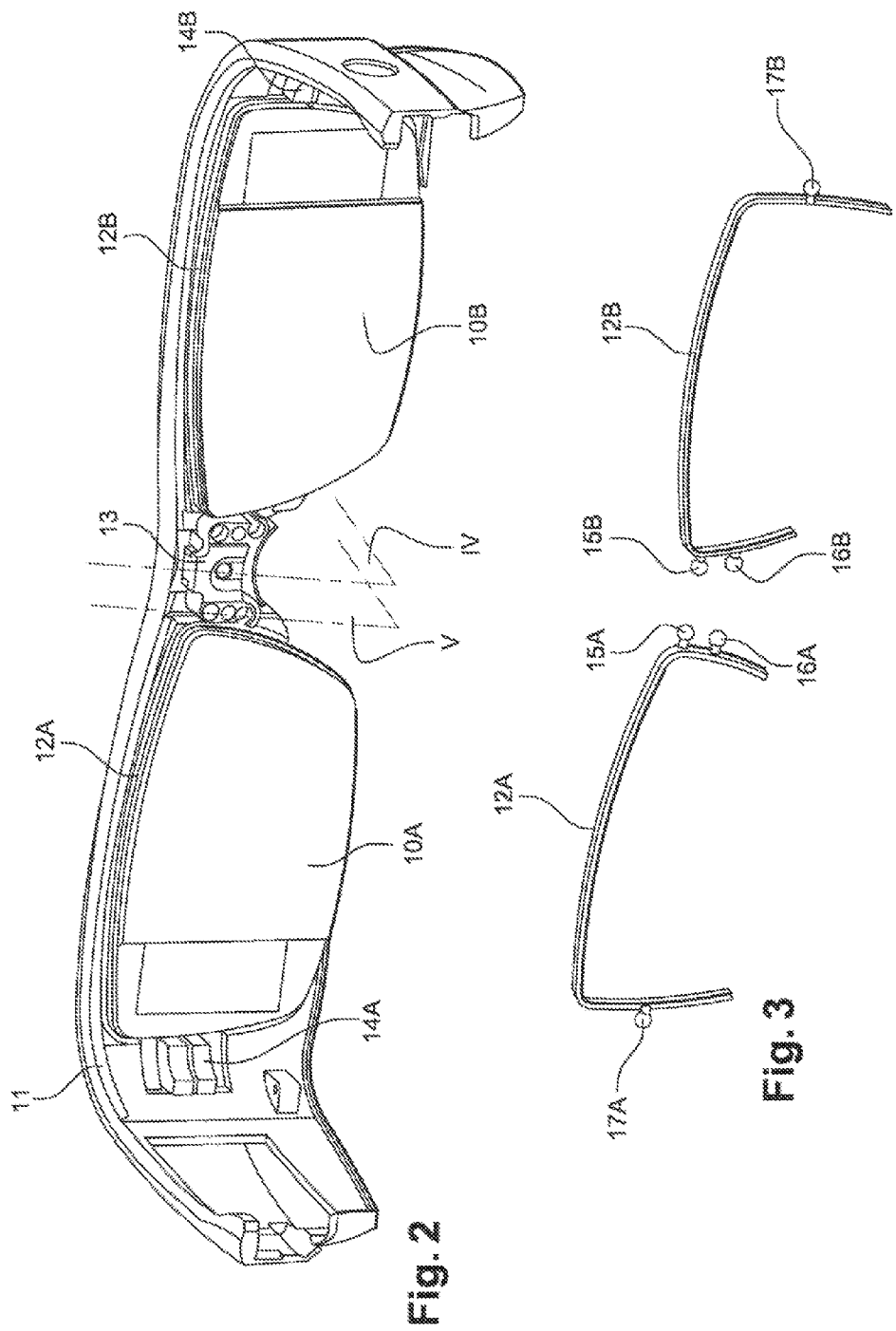

METHOD OF ADJUSTING A DISPLAY OF BINOCULAR TYPE COMPRISING A PAIR OF SPECTACLES AND DISPLAY FOR THE IMPLEMENTATION OF THIS METHOD

RELATED APPLICATION

This application is a National Phase application of PCT/FR2010/051143, which in turn claims the benefit of priority from French Patent Application No. 09 54841 filed on Jul. 10, 2009, the entirety of which is incorporated by reference.

BACKGROUND

1. Field of the Invention

The present invention relates to a method, of adjusting a binocular type device comprising a pair of eyeglasses and fitted with an optical imager for each eye that serves to project image or multimedia type information.

2. Description of Related Art

The term "binocular" means a display that provides a virtual, image for each eye of the wearer.

An example of a prior art binocular display is shown in FIG. 1.

In that display, the optical imagers 1, 2 are designed to shape light beams coming from a miniature screen 3, 4 of an electronic and optical system for generating light beams. Each optical imager directs light beams towards a corresponding eye O1, O2 of the wearer so as to enable the information content to be viewed.

In such a display, an electronic signal carrying information is delivered to each miniature screen by a cable. From this signal, the miniature screen, illuminated by a backlight, generates a pixilated image corresponding to the information. By way of example, it is possible to use a "KOPIN Cyberdisplay 320 color" screen that, generates images of 320×240 pixels having dimensions of 4.8 millimeters (mm)×3.6 mm. The screens are put into reference positions relative to the optical imagers by a mechanical interface. A protective shell protects the assembly completely or in part.

In order to obtain good viewing with such a display, it is important for the image I1 seen by the left eye and the image I2 seen by the right eye to be superposed.

At present, in order to align these left and right images of a binocular display, there is a step during the assembly method that consists in physically moving the miniature screens 3, 4 perpendicularly to the optical axes A1, A2 of the optical imagers, and in turning them in their planes so as to move at least one of the virtual images in corresponding manner, thereby causing the left and right images to be brought into superposition.

More precisely, the prior art alignment method consists in fastening the first screen, e.g. the left screen 3, relative to the left imager 1, typically by adhesive, and then in moving the right screen 4 perpendicularly to the optical axis A2 of the right imager and possibly turning it in its plane so as to bring the right image into coincidence with the left image, and once this has been done, locking it in the aligned position by means of adhesive.

That type of solution requires shells or casings to be designed that enable miniature screens to be moved transversely in this way for adjustment purposes, and also a system for providing temporary locking prior to final fastening by adhesive.

That method requires a step that is lengthy and difficult from a handling point of view, which in practice makes it difficult to obtain good productivity.

Finally, and above all, that type of adjustment is fiddly since it requires micrometric movements of the screen and thus a mechanical arrangement for micrometric adjustment that is complex in terms of its structure and its implementation.

Patent document US 2003/0184868 discloses a method of adjusting a binocular display that comprises, for each eye of the wearer, an optical imager for shaping light-beams corresponding to an image emitted by a beam generator device and for directing them to each of the wearer's eyes so as to enable information content contained in a virtual image to be viewed, that display being associated with a pair of eyeglasses having two lenses supported by a frame. According to that document, the arrangement forming the imager may be moved in order to perform the adjustment.

That type of adjustment is likewise fiddly since it requires micrometric movements of the imager and thus a mechanical arrangement for micrometric adjustment that is complex as to its structure and its implementation.

Patent document WO 2007/125257 thus envisages proceeding with the alignment of the right and left images without any physical movement of the miniature screens, but rather by moving the image that is emitted on the screen electronically, so as to obtain an adjusted position for the image on the screen that corresponds to both virtual images being superposed.

OBJECTS AND SUMMARY

Nevertheless, whenever it is desired to obtain a virtual image of relatively large size, such an electronic method is found to be insufficient in terms of adjustment amplitude. Furthermore, the operation of electronically pivoting the image is very burdensome and complex to perform.

The invention solves those problems by proposing a mechanical method of adjusting a binocular display that can be implemented using standard elements, since the adjustment movements involved are of the order of one-tenth of a millimeter.

The invention thus consists in an adjustment method for adjusting a binocular display, the display comprising for each eye of the wearer, an optical imager for shaping light beams corresponding to an image emitted by a beam generator device and for directing them towards each of the wearer's eyes so as to enable information content contained in a virtual image to be viewed, the display being associated with a pair of eyeglasses having two lenses supported by a frame; the method being characterized in that it consists in moving at least one said lens relative to said frame with three degrees of freedom, in order to obtain superposition of the two virtual images, each said imager being contained in each said lens of said pair of eyeglasses.

This adjustment method involves movements of the order of one-tenth of a millimeter and can therefore be performed using standard tools such as screws and screwdrivers, or the equivalent.

Preferably, the adjustment is performed in the factory or by an optician, and the various component elements are then covered and protected.

In a preferred embodiment, said movement comprises a first step of pivoting at least one lens in its plane in order to obtain two virtual images that are parallel.

Preferably, said movement comprises a second step of pivoting at least one lens about a horizontal axis in order to align both virtual images on a horizontal axis.

Preferably, the movement comprises a third step of pivoting at least one lens about an inclined axis in order to align both virtual images on a vertical axis.

The invention also provides a binocular display for implementing this adjustment method, the display being characterized in that each said imager is contained in said lens of said pair of eyeglasses, and in that it includes a total or partial rim for each lens, each rim including two fastener and adjustment means, first fastener and adjustment means connected to a central part connected to said frame above the nose rest, and second fastener and adjustment means connected to a side part secured to said frame in the proximity of each branch of the frame.

In a preferred embodiment, said first fastener and adjustment means are constituted by two circular section elements that are superposed in the plane of the lens.

Preferably, said central part is formed by a slider of adjustable height on a part that is secured to the frame.

Advantageously, each side branch of said slider includes two cylindrical housings of longitudinal axis parallel to the plane of symmetry of the slider and receiving said superposed elements that are adjustable in position along said longitudinal axis.

Preferably, said second fastener and adjustment means are constituted by a sphere arranged in said side part in a ball-joint.

Advantageously, said sphere is arranged in the same horizontal plane as the lower element of the first-fastener and adjustment means.

Advantageously, said adjustments are performed by means of screws.

BRIEF DESCRIPTION OF THE DRAWINGS

The invention is described below in greater detail with the help of figures that merely show a preferred embodiment of the invention.

FIG. 2 is a perspective view of a binocular display in accordance with the invention, with the branches or "temples" of the pair of eyeglasses removed.

FIG. 3 is a perspective view of lens rims of the display.

DETAILED DESCRIPTION

Figure 1:
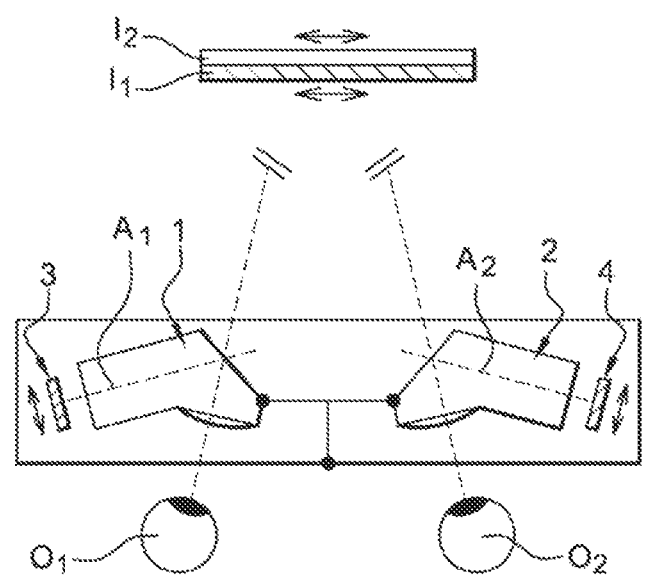
FIG. 1 is a diagram of a prior art binocular display.
Figure 4:
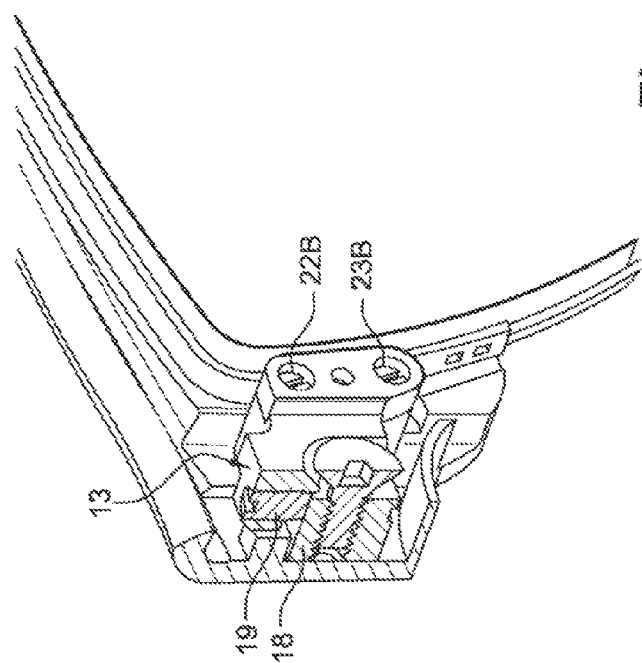
FIG. 4 is a perspective view of the display in section on plane IV of FIG. 2.
Figure 5:
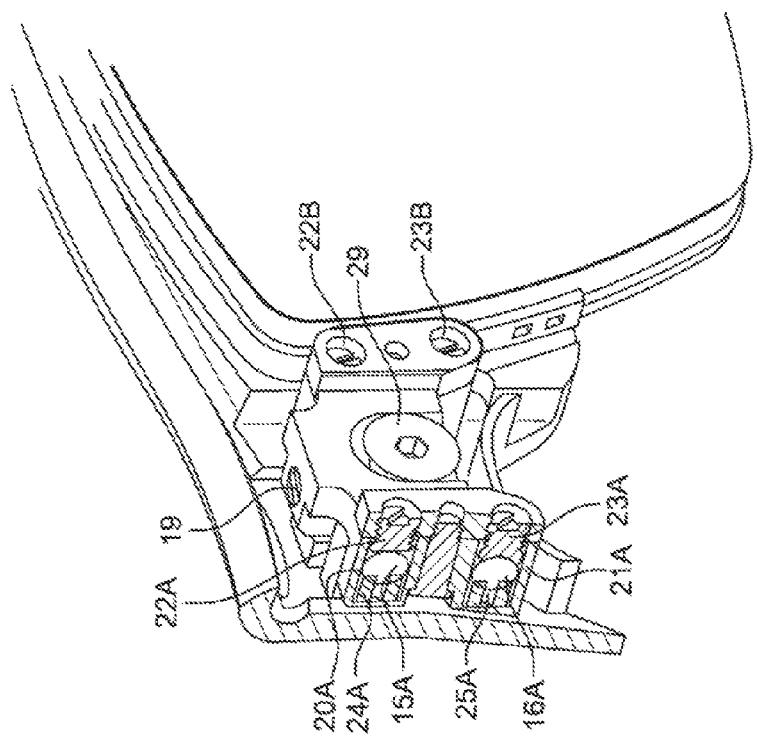
FIG. 5 is a perspective view of the display, in section on plane V of FIG. 2.
Figure 6:
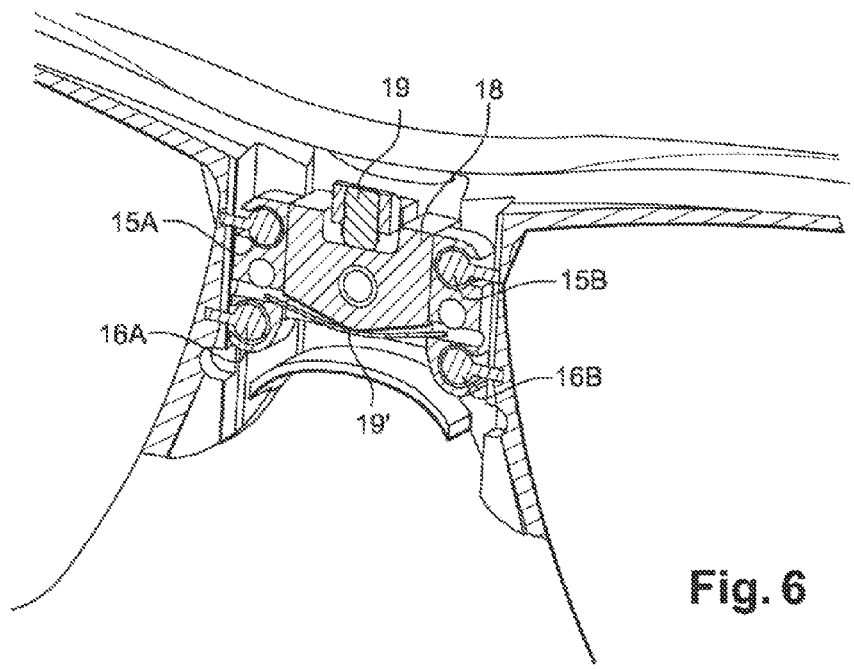
FIG. 6 is a fragmentary view in perspective and in longitudinal section of the display.

As shown in FIG. 2, a binocular display in accordance with the invention comprises, for each eye of the wearer, an optical imager, e.g. as described with reference to FIG. 1, for forming light beams that correspond to an image emitted by a beam generator device and for directing them to each of the eyes of the wearer in order to enable information content contained in a virtual image to be viewed.

Each imager is integrated in each, lens 10A, 10B of a pair of eyeglasses fitted with a lens support frame 11 for the purpose of implementing the adjustment method in accordance with the invention.

The display has a complete or partial rim 12A, 12B around each lens, each rim including two fastening and adjustment means, a first fastening and adjustment means being connected to a central part 13 connected to the frame 11 above the nose rest, and a second fastener and adjustment means being connected to a side part 14A, 14B secured to the frame and close to each of the branches of the frame.

As can clearly be seen in FIG. 3, the first fastener and adjustment means are constituted by two circular section elements 15A, 16A, 15B, 16B that are superposed in the plane of the lens. In this embodiment, these elements are spheres, but they could equally well be circular disks extending parallel to the plane of the corresponding lens.

The second fastener and adjustment means are constituted by a sphere 17A, 17B disposed in the side part 14A, 14B as a ball-joint.

As can be seen in FIGS. 2, 4, 5, and 6, the central part 13 is in the form of a slider that is adjustable in height on a part 18 that is secured to the frame, e.g. being adhesively bonded to the frame. A first adjustment screw 19 screwed into the base of the slider and bearing against the cylinder 18 serves to adjust the height position of the slider on the cylinder 18 against a force exerted by a spring wire 19' that is prestressed under the stationary part 18 and that has its ends blocked in the side branches of the slider, serving to perform a first step of pivoting at least one lens in its plane in order to obtain two virtual images that are parallel, as is described in greater detail below.

Each side branch of the slider has two cylindrical housings 20A, 21A of longitudinal axis parallel to the plane of symmetry of the slider and serving to receive the superposed elements ISA, 16A of the rim, being adjustable in position along said longitudinal axis by using a second, screw 22A, 22B and a third screw 23A, 23B. For this position adjustment, the superposed elements ISA, 16A of the rim bear against a compressible element 24A, 24A, e.g. an elastomer pad, situated at the bottom of the corresponding cylindrical housing 20A, 21A. By the rim sliding in this way, a second step of pivoting at least one lens about a horizontal axis is performed in order to align the two virtual images on a horizontal axis, and a third pivot step of at least one lens about an inclined axis is performed in order to align the two virtual images on a vertical axis, as described in greater detail below.

Figure 7:
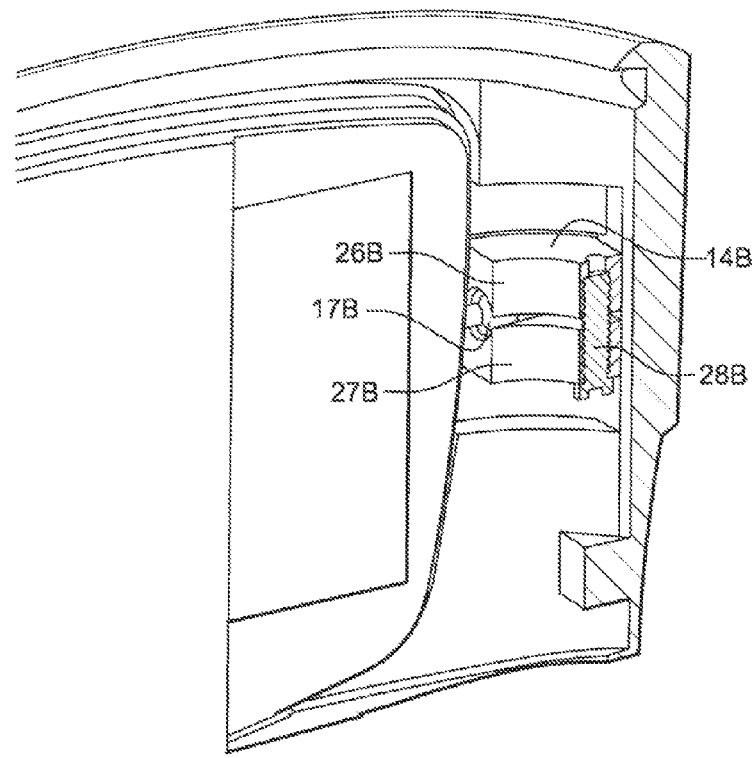
FIG. 7 is a fragmentary view in perspective and in section of the display.

As shown in FIG. 7, the second fastener and adjustment means are constituted by a sphere 17B placed in the side part 14B via a ball-joint. More precisely, this side part is constituted by two cradles 26B, 27B that are connected together by a screw 28B. This ball-joint is stationary. In the embodiment shown, the sphere 17A, 17B is in the same horizontal plane as the lower element 16A, 16B of the first fastener and adjustment means.

The adjustment method in accordance with the invention consists in moving at least one lens with three degrees of freedom relative to the frame 11 in order to superpose the two virtual images.

This movement comprises:

a first step of pivoting at least one lens in its plane in order to obtain two virtual images that are parallel, by adjusting the first screw 19 that causes the slider to move parallel to its plane of symmetry; once the aligned position has been obtained, the slider of the central part 13 is locked by tightening a central screw 29 having a countersunk head;

a second step of pivoting at least one lens about a horizontal axis defined by the horizontal straight line joining the ball-joint sphere 17A, 17B and the bottom element 16A, 16B of the first fastener and adjustment means, so as to move the corresponding virtual image vertically and align both virtual images on a horizontal axis, by adjusting the second screw 22A, 22B that drives pivoting of the lens about said horizontal axis; and a third, step of pivoting at least one lens about an inclined axis defined by the inclined straight line joining the ball-joint sphere 17A, 17B and the top element 15A, 15B of the first fastener and adjustment means in order to move the corresponding virtual, image horizontally and in order to align both virtual images on a vertical axis by adjusting a third screw 23A, 23B that causes the lens to pivot about said inclined axis.

The invention claimed is:

1. An adjustment method for adjusting a binocular display, where the display has, for each eye of the wearer, an optical imager for shaping light beams emitted by a beam generator device to form an image directed towards each of the wearer's eyes so as to enable information content contained in a corresponding virtual image to be viewed, the display further supporting a pair of eyeglasses having two lenses supported by a frame, said lenses containing said optical imagers, said method comprising the steps of:

moving at least one said lens relative to said frame with three degrees of freedom, in order to obtain superposition of the two virtual images, wherein said moving step includes a first step of pivoting at least one lens in its plane in order to obtain two virtual images that are parallel and a second step of pivoting at least one lens about a horizontal axis in order to align both virtual images on horizontal axis and a third step of pivoting at least one lens about an inclined axis in order to align both virtual images on a vertical axis.

2. A binocular display for implementing the adjustment method according to claim 1, wherein in the display, each said imager is contained in said lens of said pair of eyeglasses, and in that said display includes a total or partial rim for each lens, each rim including two fastener and adjustment means, first fastener and adjustment means connected to a central part connected to said frame above the nose rest, and second fastener and adjustment means connected to a side part secured to said frame in the proximity of each branch of the frame, said fastener and adjustment means assuring said moving steps.

3. A display according to claim 2, wherein said second fastener and adjustment means are constituted by a sphere arranged in said side part in a ball-joint.

4. A display according to claim 1, wherein said first fastener and adjustment means are constituted by two circular section elements that are superposed in the plane of the lens.

5. A display according to claim 4, said sphere is arranged in the same horizontal plane as the lower element of the first fastener and adjustment means.

6. A display according to claim 1, wherein said central part is formed by a slider of adjustable height on a part that is secured to the frame.

7. A display according to claim 1, wherein each side branch of said slider includes two cylindrical housings of longitudinal axis parallel to the plane of symmetry of the slider and receiving said superposed that are adjustable in position along said longitudinal axis.

8. A display according to claim 1, wherein said adjustments are performed by means of screws.

\* \* \* \* \*